United States Patent [19]

Clavelloux et al.

[11] 4,311,045

[45] Jan. 19, 1982

[54] DEVICE FOR MEASURING SEA CURRENTS AT GREAT DEPTHS

[75] Inventors: Noël Clavelloux; Francois Peynaud, both of Paris, France

[73] Assignee: Thomson-CSF, Paris, France

[21] Appl. No.: 151,589

[22] Filed: May 20, 1980

[30] Foreign Application Priority Data

May 23, 1979 [FR] France ................................ 79 13191

[51] Int. Cl.³ ............................................. G01D 21/00
[52] U.S. Cl. .................................................. 73/170 A
[58] Field of Search ................ 73/170 A, 189, 861.27, 73/861.29; 364/110, 420; 367/131

[56] References Cited

U.S. PATENT DOCUMENTS

4,104,912  8/1978  Clavelloux et al. ................... 73/189

4,221,128  9/1980  Lawson et al. ................... 73/861.29

Primary Examiner—Jerry W. Myracle
Attorney, Agent, or Firm—Oblon, Fisher, Spivak, McClelland & Maier

[57] ABSTRACT

A device for measuring sea currents at great depths as a function of the depth.

A spherical shaped plunger having negative floatability is dropped from a boat and descends to the bottom of the sea, releases its ballast and rises to the surface where it is recovered.

Acoustic responding buoys positioned geographically receive pulses emitted by the plunger and respond. The plunger-buoy distances are determined sequentially and stored in the plunger. After recovery of the plunger by the boat a computer determines the currents at the different depths.

12 Claims, 6 Drawing Figures

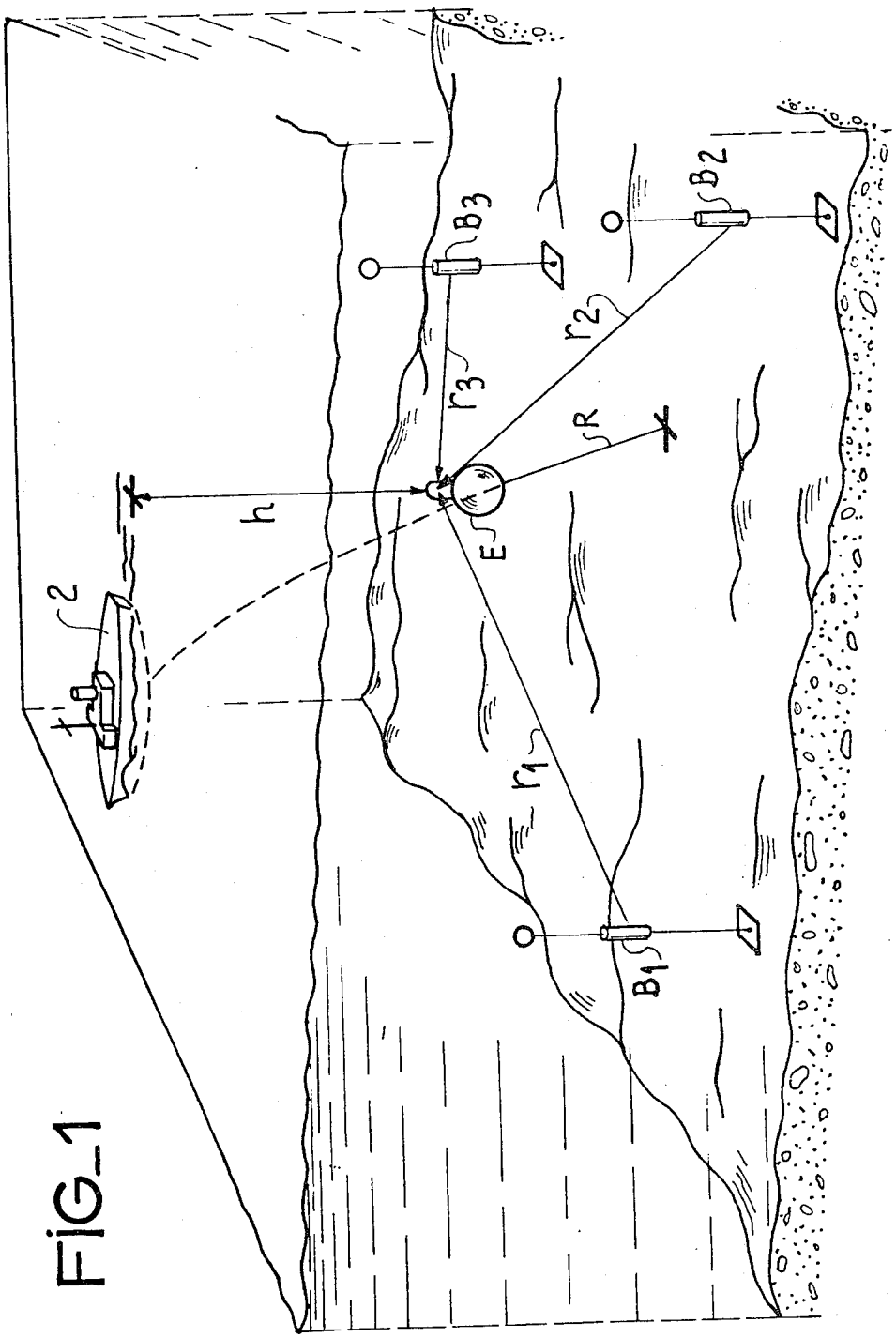
FIG_1

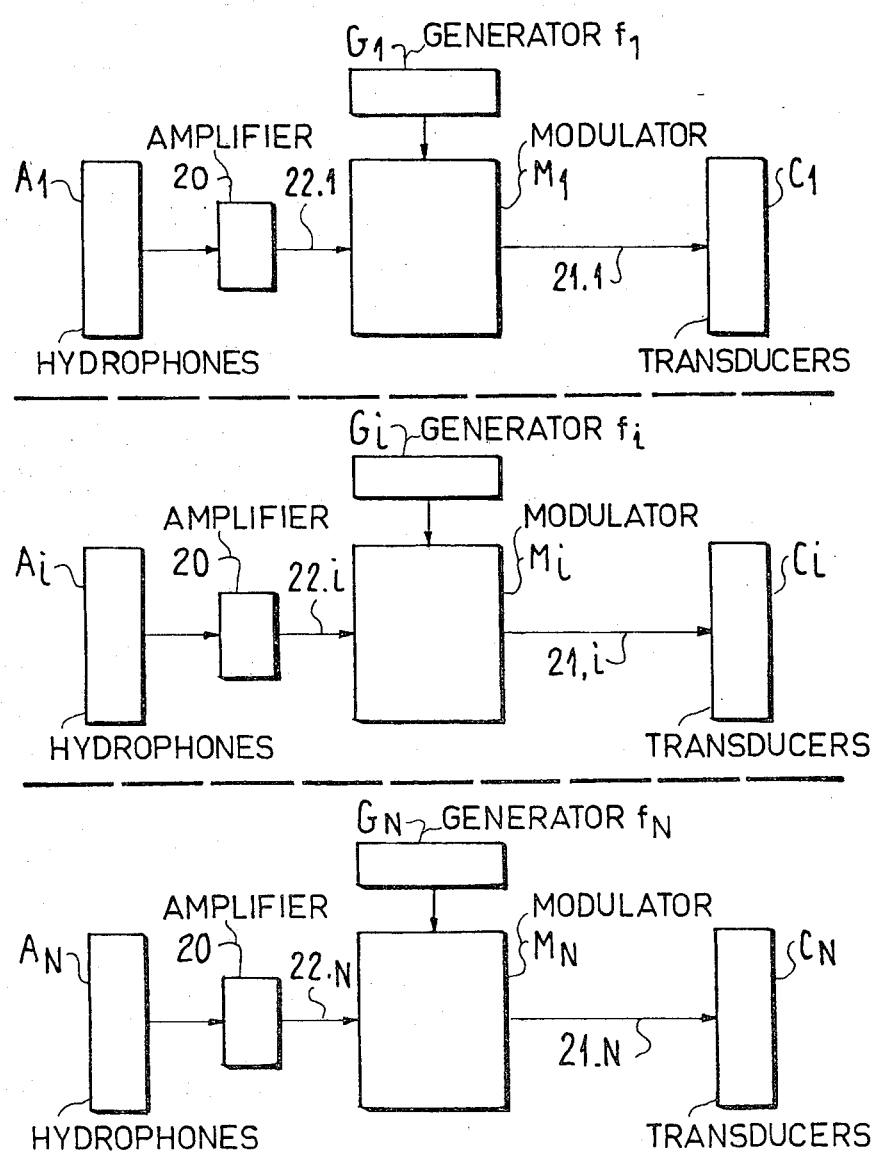

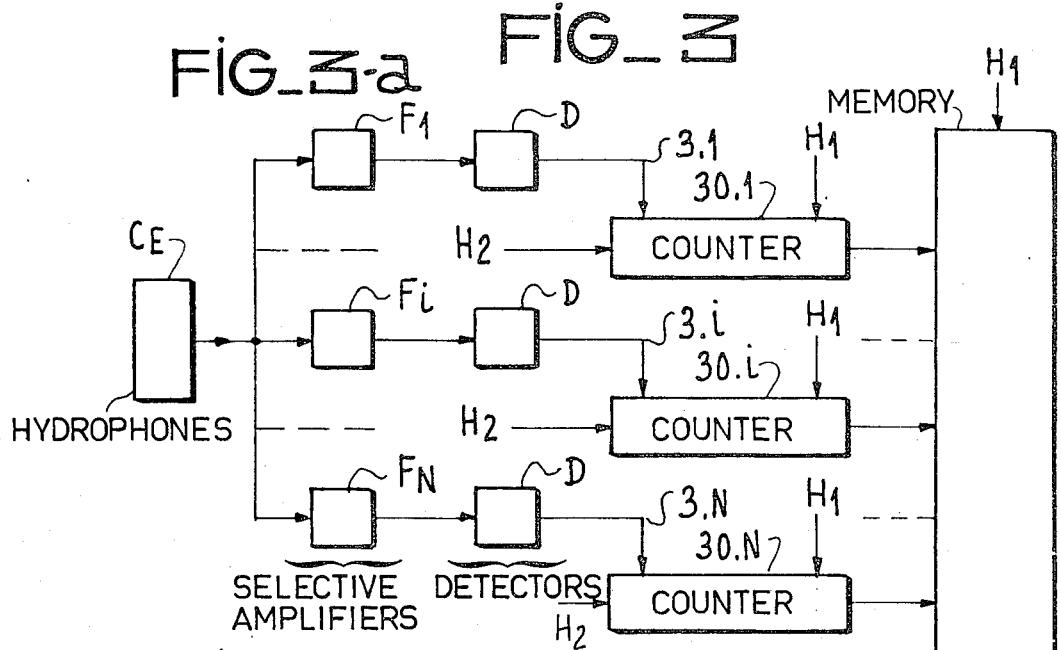
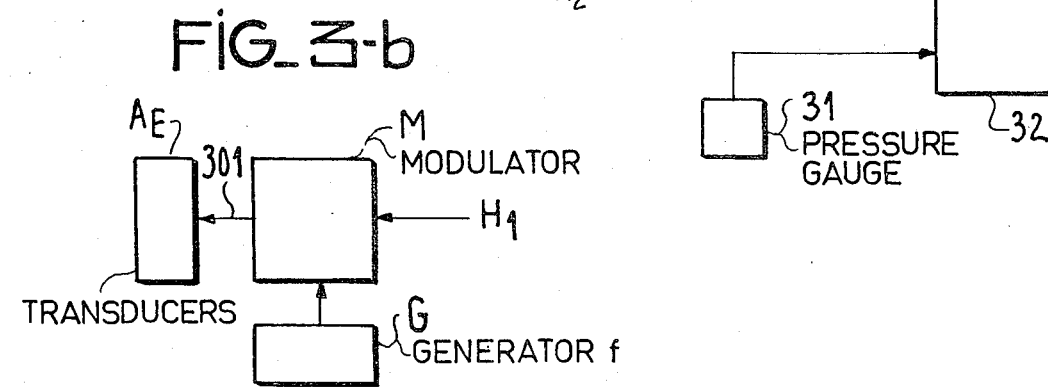
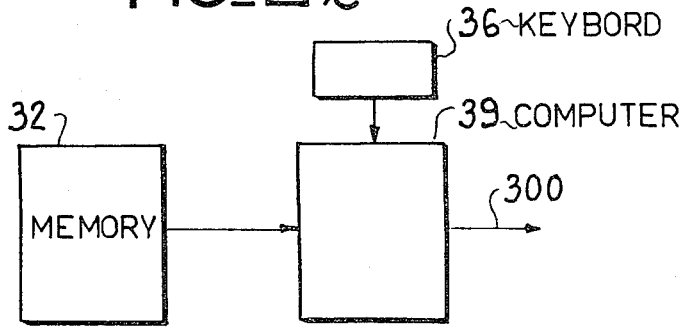

FIG_4
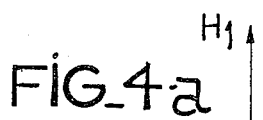
FIG_4·a
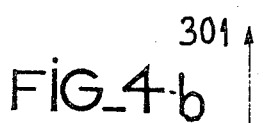
FIG_4·b
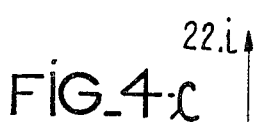
FIG_4·c
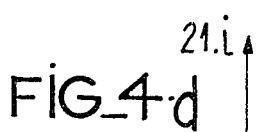
FIG_4·d
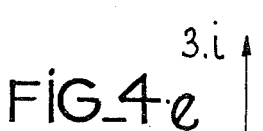
FIG_4·e
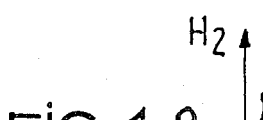
FIG_4·f

DEVICE FOR MEASURING SEA CURRENTS AT GREAT DEPTHS

FIELD OF THE INVENTION

The present invention relates to a device for measuring sea currents in deep water.

BACKGROUND OF THE INVENTION

The knowledge of deep sea currents is important in oil-well boring techniques out at sea, especially for calculating the stresses on the immersed structures. Furthermore, in the case of action by divers or submarines, it is important to know the speeds of the currents for safe working. Another application is the search for nodules.

It is known to measure the speed and the direction of currents by means of a propeller current meter fixed to the sea bed by an anchoring line.

The drawbacks of this device are in only providing a pin-point measurement, of limited accuracy because of the mechanical friction of the propeller and at a depth limited because of the difficulty in providing too long an anchoring line.

It is further known to measure the currents by means of a Doppler effect sonar. The signals used are obtained by volume reverberation of the acoustic waves. These devices supply the speeds of the currents in different depth ranges with good accuracy but they have the drawback of not being able to be used at depths greater than 1000 meters because of the absorption of the acoustic waves and the divergence of the beam emitted by the sonar.

SUMMARY OF THE INVENTION

The device of the invention remedies these drawbacks by enabling currents to be measured at depths to over 6000 meters with slices of depth measurement between 5 and 40 meters and with an accuracy for the speed of the currents reaching 0.15 m/sec.

According to one of the features of the invention, the currents are measured by means of a negative floatability spherical shaped body, i.e. denser than water, called "plunger". This plunger descends to the sea bed and then comes up again to the surface, after releasing its ballast, where it may be recovered by the surface boat which dropped it. The plunger contains transmitters and receivers comunicating with responding buoys having known positions. The successive signals received by the plunger are stored and used after recovery for calculating the speed of the currents at different depths.

Briefly, according to the main feature, this is a device for measuring sea currents, or current meter, by means of a plunger dropped from a boat and, descending to the sea bed, drifting with the currents, wherein N acoustic responding buoys $B_1, B_2, \ldots B_i, \ldots B_N$ with $N \geq 2$ are lowered to the bottom of the sea and positioned geographically, these buoys respond to pulses at frequency f emitted by the plunger under the control of a clock H1, by pulses at frequencies $f_1, f_2, \ldots f_i, \ldots f_N$, the plunger receives the pulses emitted by all the buoys which, applied to counters $30.1, 30.2, \ldots 30.i, \ldots 30.N$, determine the times $t_1, t_2, \ldots t_i, \ldots t_N$ of the buoy-plunger distances covered, these buoy-plunger distances $r_1, r_2, \ldots r_i, \ldots r_N$ being given by the relationship $r_i = Ct_i$ where C is the velocity of the acoustic waves in the medium, the successive values of $r_i$ being supplied to a memory in the plunger and when the plunger arrives at the sea bottom it is freed of its ballast and rises again to the surface where it is recovered by the boat.

The above and other objects, features and advantages of the present invention will become apparent from the following description given solely by way of non limiting illustration, when taken in conjunction with the accompanying drawings.

DESCRIPTION OF THE DRAWINGS

FIG. 1 is a schematical view of the plunger descending to the sea bed and its position in relation to the boat and the responding buoys.

FIG. 2 shows the transmitting and receiving devices of the responding buoys.

FIGS. 3a, 3b and 3c show the transmitting, receiving and processing devices of the plunger.

FIGS. 4a–4f show some time signals of the device.

DESCRIPTION OF THE PREFERRED EMBODIMENT

FIG. 1 shows a schematical view of the current measuring device of the invention.

A boat 2 has dropped a plunger E whose floatability is such that its speed of descent has a predetermined value V. During its descent, the float drifts under the effect of the currents following a path R.

N acoustic responding buoys $B_1, \ldots B_i, \ldots B_N$ where $N \geq 2$ are placed on the sea-bed, for the sake of simplification only buoys $B_1, B_2$ and $B_3$ have been shown. Before dropping the plunger the geographical positions of the buoys are determined by known methods. The plunger is at distances $r_1, \ldots r_i, \ldots r_N$ from the buoys $B_1, \ldots B_i, \ldots B_N$ and these distances are measured by means of acoustic signals. The successive values of $r_1, \ldots r_i, \ldots r_N$ are determined by the timing of a clock $H_1$ of period $T_1$ and according to one feature of the invention these values are transferred to a memory in the plunger Having reached a certain depth, the plunger drops its ballast, rises to the surface and the distance measurements continue and are stored until it arrives on the surface of the sea.

The releasing of the ballast may be set off by a mechanism controlled by contact with the bottom, or by a predetermined hydrostatic pressure or by means of a clockwork device set to a predetermined time.

The plunger is then recovered by the boat and the memory is interrogated by the computer which determines the values of the currents at all depths. In a preferred embodiment of the invention the plunger comprises a pressure gauge measuring the depth. The values delivered by the pressure gauge are also stored and may improve the accuracy of the measurements.

The receiving/transmitting devices mounted in all the buoys are shown schematically in FIG. 2. Each of the buoys such as $B_1$ comprises receiving hydrophones $A_i$, which pick up the pulses at frequency f coming from the plunger. The signals are selectively amplified about frequency f and detected by circuit 20. The detected pulses control a modulator such as $M_i$ connected to a generator $G_i$ at frequency $f_i$. The response pulses are fed to transmitting transducers $C_i$. Thus all the buoys $B_1, \ldots B_i, \ldots B_N$ respond to the pulses from the plunger at frequency f by pulses at frequencies $f_1, \ldots f_i, \ldots f_N$, all these frequencies being different.

FIG. 3b shows the transmitting device of the plunger. A generator G at frequency f is connected to a modulator M which is controlled by clock $H_1$. The pulses generated are delivered to transmitting transducers $A_E$ of the plunger.

The receiving and processing system is shown in FIG. 3a. The receiving hydrophones $C_E$ receive the signals coming from the buoys. The signals picked up are fed to selective amplifiers $F_1, \ldots F_i, \ldots F_N$ centered on the frequencies $f_1, \ldots f_i, \ldots f_N$ and detected in detector D. The signals detected at $3.1, \ldots 3.i, \ldots 3.N$ are fed to counters $30.1, \ldots 30.i, \ldots 30.N$. The counters receive counting pulses from a clock $H_2$. The signal for starting the counting is supplied by clock $H_1$ and the signal for stopping by the signal detected such as $3.i$. The number of pulses counted is proportional to the time elapsed between transmission and reception.

At the timing of clock $H_1$, the counting signals are transferred into a memory 32, and the same applies to the pressure values coming from pressure gauge 31.

FIG. 3c shows the processing after recovery of the plunger. Memory 32 is connected to a computer 39 which receives the values of the coordinates of the positions of the buoys from keyboard 36. At the output of computer 39, the values of the currents at different depths are received at 300.

In a preferred embodiment, the memory 32 is a magnetic tape memory, the information concerning the positions of the buoys is introduced by means of a keyboard 36 and the information leaving at 300 is applied to a printer.

The calculation of the values of the float-buoy distances will be better understood from FIG. 4 which shows the trend of some signals.

On line a are shown the signals from clock $H_1$ of period $T_1$ and on line b the positive envelope $E_E(f)$ of the signal at 301 (FIG. 3b) at the frequency f applied to the transducers $A_E$.

On line c there is shown the positive envelope of the signal received by the hydrophones $A_i$ of the buoy $B_i$, $R_{BiE}(f)$ at $22.i$ in FIG. 2. On line d is shown the positive envelope at $21.i$ of the response signal from the buoy $B_i, E_{BiE}(fi)$ fed to the transducers $C_i$ at frequency $f_i$. On line e is shown the envelope of the signal received by the plunger $R_{EBi}(f_i)$ at frequency $f_i$ and detected at $3.i$.

On line f are shown the counting pulses of clock $H_2$. Counter $30.i$ will then count the pulses of clock $H_2$, line f, during time $t_i$ with $t_i=2r_i/C$. C is the velocity of the waves and $r_i$ the buoy-plunger distance.

A fixed coordinate system is defined, Oxyz tied to the buoys, where Oz is the direction of the vertical. From the values of $r_1, \ldots r_2, \ldots r_N$ computer 39 determines the values at time t of the coordinates of the plunger x(t), y(t) and z(t), for $N \geq 3$.

The measurements supplied by the pressure gauge enable further the values of depth h(t) to be known and so the accuracy of the values calculated by computer 39 to be improved.

If $N=2$, x(t), y(t) and z(t) are calculated from the values of $r_1(t)$, $r_2(t)$ and h(t).

In a preferred embodiment, it is assumed that $N=4$ and the plunger stores the values $r_1(t)$, $r_2(t)$, $r_3(t)$ and $r_4(t)$ which are supplied to computer 39. From the values $r_1(t)$, $r_2(t)$ and $r_3(t)$ are calculated the positions $x^{(1)}(t)$, $y^{(1)}(t)$ and $z^{(1)}(t)$.

The computer further determines from values $r_1(t)$, $r_3(t)$ and $r_4(t)$ the positions $x^{(2)}(t)$, $y^{(2)}(t)$ and $z^{(2)}(t)$ and finally from values $r_2(t)$, $r_3(t)$ and $r_4(t)$ it calculates the positions $x^{(3)}(t)$, $y^{(3)}(t)$ and $z^{(3)}(t)$.

By using moreover the values of depth h(t), by means of a smoothing method, e.g. the method of least squares, the values of the successive positions x(t), y(t) and z(t) are finally calculated.

From these coordinates computer 39 determines the values of the velocity components of the current in a horizontal plane at time t: dx/dt and dy/dt.

For calculating these drifts, in a preferred embodiment, the so-called Rutledge method described in the book entitled "The Mathematics of Physics and Chemistry" by H. Margenau and G. M. Murphy; Van Nostrand Company, (1961) is used.

This method of Rutledge uses the successive values of a coordinate such as $x_{n-2}$, $x_{n-1}$, $x_{n+1}$ and $x_{n+2}$ to calculate dx/dt for $x=x_n$ by means of the formula:

$$\left(\frac{dx}{dt}\right) x = x_n = \frac{1}{12T_1}[(x_{n-2}-x_{n+2})-8(x_{n-1}-x_{n+1})]$$

The velocity components of the current found as a function of time are finally supplied at the output of computer 39 depending on depth h, after comparison between the values found during the ascent and descent of the plunger.

In one embodiment, taking:
depth of sea $\approx 6000$ m
size of the field of the buoys $8000 \times 8000$ m
descent velocity of the plunger 0.25 m/sec
thickness of the slice of water for the measurement $\approx 25$ m
accuracy on the velocity of the currents $\approx 0.15$ m/sec

What is claimed is:

1. A device for measuring sea currents or current meter by means of a plunger released from a boat, descending to the bottom of the sea and drifting with the currents, wherein N acoustic responding buoys $B_1, B_2, \ldots B_i, \ldots B_N$ with $N \geq 2$ are lowered to the bottom of the sea and positioned geographically, these buoys responding to pulses at frequency f emitted by the plunger under the control of a clock by pulses at frequencies $f_1, f_2, \ldots f_i, \ldots f_N$, the plunger receives the pulses emitted by all the buoys which, applied to counters $30.1, 30.2 \ldots 30.i \ldots 30.N$, determine the times $t_1, t_2, t_i, \ldots t_N$ for covering the buoy-plunger distances, these buoy-plunger distances $r_1, r_2, \ldots r_i, \ldots r_N$ being given by the relationship $r_i=Ct_i$ where C is the velocity of the acoustic waves in the medium, the successive values of $r_1$ being supplied to a memory in the plunger and when the plunger arrives at a certain depth it releases its ballast and rises to the surface where it is recovered by the boat.

2. The current meter as claimed in claim 1, wherein the plunger has a substantially spherical shape.

3. The current meter as claimed in claim 1, wherein the plunger comprises a pressure gauge supplying the successive values of the depth of the contrivance and these values are stored in the memory on board the plunger.

4. The current meter as claimed in claim 1, wherein $N \geq 3$ and, after recovery of the plunger by the boat, a computer on board the boat receives, on the one hand, the values of the geographical coordinates of buoys $B_1, B_2, \ldots B_i, \ldots B_N$ and, on the other hand, the values of the responding buoy-plunger distances as a function of time t supplied by the memory of the contrivance $r_1(t)$, $r_2(t), \ldots r_i(t), \ldots r_N(t)$ and wherein the computer determines the values $x(t)$, $y(t)$ and $z(t)$ of the successive coordinates of the plunger in relation to a system of coordinates tied to the buoys.

5. The current meter as claimed in claim 4, wherein the number of buoys $N=4$, the computer receives the values $r_1(t)$, $r_2(t)$, $r_3(t)$ and $r_4(t)$, and from the values $r_1(t)$, $r_2(t)$ and $r_3(t)$ it calculates values $x^{(1)}(t)$, $y^{(1)}(t)$ and $z^{(1)}(t)$, from values $r_1(t)$, $r_3(t)$ and $r_4(t)$ it calculates values $x^{(2)}(t)$, $y^{(2)}(t)$ and $z^{(2)}(t)$ and from values $r_2(t)$, $r_3(t)$ and $r_4(t)$ it calculates values $x^{(3)}(t)$, $y^{(3)}(t)$ and $z^{(3)}(t)$ and a smoothing method allows values of $x(t)$ to be obtained from successive values of $x^{(1)}(t)$, $x^{(2)}(t)$ and $x^{(3)}(t)$, the values of $y(t)$ to be obtained from successive values of $y^{(1)}(t)$, $y^{(2)}(t)$ and $y^{(3)}(t)$ and values of $z(t)$ to be obtained from successive values of $z^{(1)}(t)$, $z^{(2)}(t)$ and $z^{(3)}(t)$.

6. The current meter as claimed in claims 4 or 5, wherein the measurements of the depths are used for smoothing functions $x(t)$, $y(t)$ and $z(t)$.

7. The current meter as claimed in claim 5, wherein, for calculating the values of $x(t)$, $y(t)$ and $z(t)$, the values $r_1(t)$, $r_2(t)$ and $r_3(t)$ during the ascent and the descent of the plunger are used.

8. The current meter as claimed in claims 1 or 4, wherein $N=2$ and the values of the coordinates of the plunger are determined by the computer from the values $r_1$ and $r_2$ as well as from the value of the depth supplied by the pressure gauge.

9. The current meter as claimed in claim 4, wherein the computer supplies to a display device the values of the horizontal speeds of the current $dx/dt$ and $dy/dt$ as a function of the depth.

10. The current meter as claimed in claim 1, wherein the plunger comprises a ballast releasing device set off by contact of the plunger with the sea bottom which causes the plunger to rise to the surface.

11. The current meter as claimed in claim 1, wherein the plunger comprises a ballast release device set off by a manometric device, preset to a predetermined immersion and which causes the plunger to rise to the surface.

12. The current meter as claimed in claim 1, wherein the plunger comprises a ballast release device set off by a clockwork device preset to a given time and which causes the plunger to rise to the surface.

* * * * *